United States Patent

Bruun et al.

[11] 3,893,294
[45] July 8, 1975

[54] CATALYTIC MONOPROPELLANT REACTOR WITH THERMAL FEEDBACK

[75] Inventors: Eugene E. Bruun, Simsbury; Ray A. Simmons, Enfield, both of Conn.

[73] Assignee: United Aircraft Corporation, East Hartford, Conn.

[22] Filed: Sept. 10, 1973

[21] Appl. No.: 395,806

[52] U.S. Cl............ 60/39.46 M; 60/200 R; 60/260; 60/39.82 C
[51] Int. Cl............................. F02k 9/02; F02c 3/20
[58] Field of Search....... 60/39.46, 200 R, 207, 219, 60/220, 257, 39.82 C, 260

[56] References Cited
UNITED STATES PATENTS

| | | | |
|---|---|---|---|
| 3,091,520 | 5/1963 | Newburn | 60/257 |
| 3,182,451 | 5/1965 | Messerly | 60/254 |
| 3,377,140 | 4/1968 | Hall | 60/39.46 |
| 3,447,316 | 6/1969 | White | 60/39.46 |
| 3,535,879 | 10/1970 | Kuntz | 60/200 R |
| 3,719,046 | 3/1973 | Sutherland et al | 60/39.46 |
| 3,772,885 | 11/1973 | Munding | 60/219 |

Primary Examiner—C. J. Husar
Assistant Examiner—Warren Olsen
Attorney, Agent, or Firm—Norman Friedland

[57] ABSTRACT

A monopropellant hydrazine thrust reactor includes a connection between the gas generating chamber to a low pressure point by way of the catalytic or thermal bed for enhancing the catalytic and thermal decomposition of the propellant.

5 Claims, 3 Drawing Figures

CATALYTIC MONOPROPELLANT REACTOR WITH THERMAL FEEDBACK

BACKGROUND OF THE INVENTION

This invention relates to catalytic or thermal reactors and more particularly to means for increasing the effectiveness of the catalyst or thermal bed by providing regenerative means for creating hot surfaces in the bed.

A monopropellant reactor which may be utilized as a thrustor or a gas generating means is generally applicable for space manuevers, transorbit corrections, attitude control, station acquisition, keeping and changing spin controls and planet landing and takeoff or driving a gas turbine. The monopropellant rocket engine provides the required thrust by catalytic and/or thermal decomposition of the monopropellant and expulsion of high temperature gases through an expansion nozzle. The hot gases are generated by an exothermic reaction. While not limited thereto the monopropellant may be hydrazine.

Obviously, since the thrustor is utilized in space vehicles its size and weight are of paramount importance, and accordingly, a reduction in size or weight becomes extremely important. Thus the purpose of this invention is to regenerate the catalytic or thermal bed by conducting the decomposed monopropellant products through the bed to create hot surfaces for more effective decomposition reaction. This permits a smaller bed and hence a smaller and lighter unit for a given thrust than was obtainable heretofore.

SUMMARY OF THE INVENTION

The purpose of this invention is to provide an improved monopropellant rocket engine.

A still further object of this invention is to provide an improved rocket monopropellant engine of the type described wherein a regenerator is utilized to impose hot surfaces in the catalytic or thermal bed.

A still further object of this invention is to provide a plurality of tubes communicating with the decomposed gases and a low pressure source by way of the bed.

A still further object of this invention is to provide for a monopropellant rocket engine of the type described, passage means which conduct decomposed monopropellant in a particular path adjacent to the catalytic or thermal bed in order to create hot surfaces adjacent thereto.

DESCRIPTION OF THE PREFERRED EMBODIMENT

Figure 1:
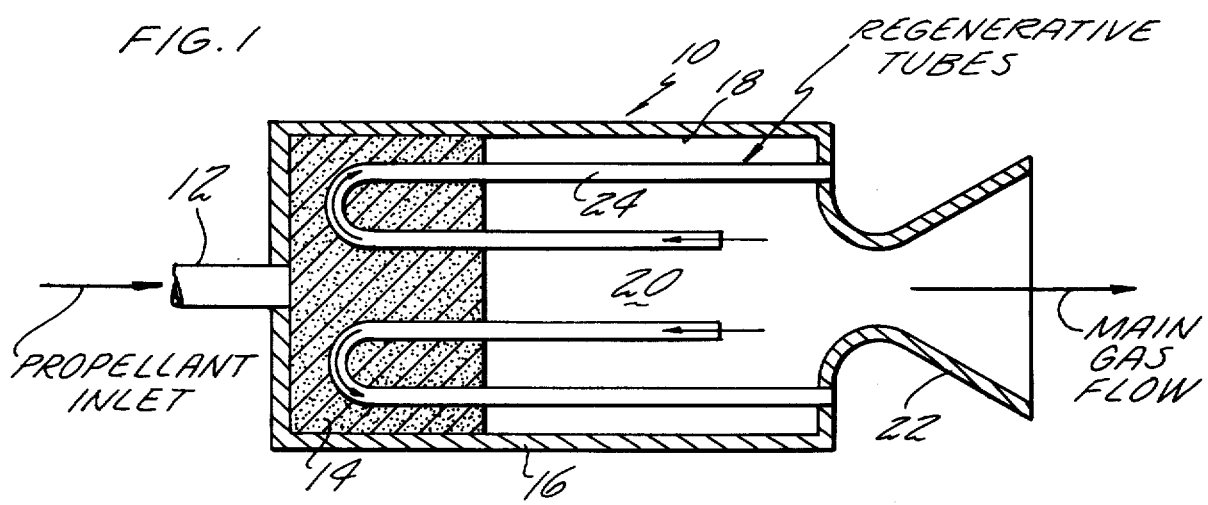
FIG. 1 is a view in section illustrating the details of this invention.

Reference is now made to FIG. 1 which shows a monopropellant thrustor generally illustrated by numeral 10 including injector 12 merely shown schematically, but to be understood that any well-known suitable type of injector which serves to distribute the flow of monopropellant uniformly to the bed 14 may be used. The reactor engine 10 generally includes housing 16 which defines annular shaped cavity 18 having disposed on one end catalytic or thermal bed 14 and the decomposition chambers 20 on the other. As is well known a suitable exhaust nozzle is secured to the end of the casing 16 and serves to expel the hot gases. While in this embodiment the expelled hot gases generate thrust, it being understood that the rocket may also be utilized to generate hot gases for driving, for example, a turbine or other apparatus.

According to this invention a plurality of tubes 24 are inserted into the casing 16 such that the inlet is adjacent the decomposition chamber 20 for leading hot gases thru the tube which passes through the bed 14 and discharges to a low pressure source, in this instance, overboard. The hot gases passing through the tubes 24 serve to provide localized hot surfaces in the catalytic or thermal bed in order to enhance the decomposition reaction when the monopropellant passes through the bed.

Figure 2:
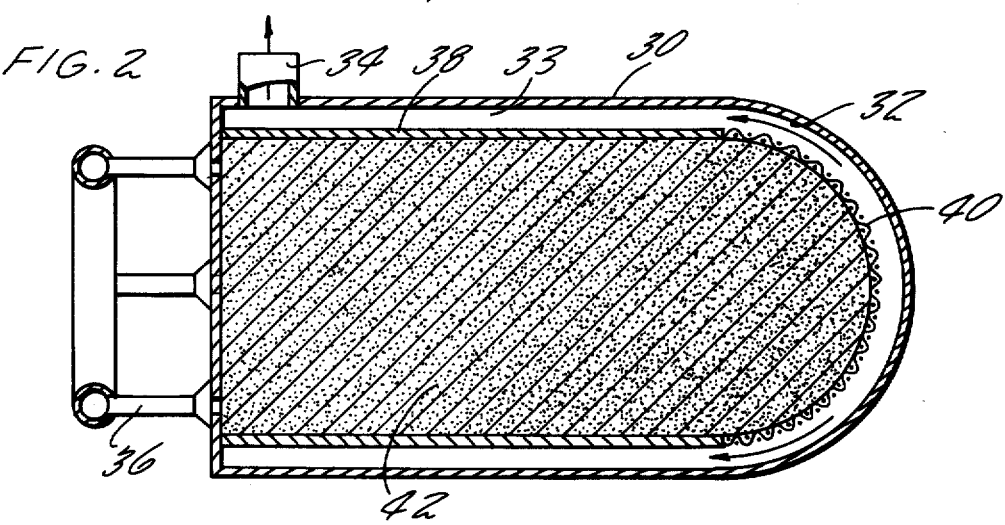
FIG. 2 is another type of rocket engine illustrating another embodiment of this invention.

FIG. 2 shows another arrangement of this invention wherein the reactor casing 30 completely encloses chamber 32 and outlet 34 is formed therein adjacent injector 36. Cylindrically shaped member 38 is coaxially mounted in and is spaced from the casing 30 defining annular gap 33. Screen 40 retaining the catalytic or thermal bed 42 is mounted at the end opposite the injector 36 permitting the hot gases to escape into gap 33 and hence are conducted back toward the inlet and discharging through the outlet 34. Thus the hot gases adjacent the wall 38 which is a suitable high thermal conductive material provide a hot surface for increasing the effectiveness of the decomposition reaction.

Figure 3:
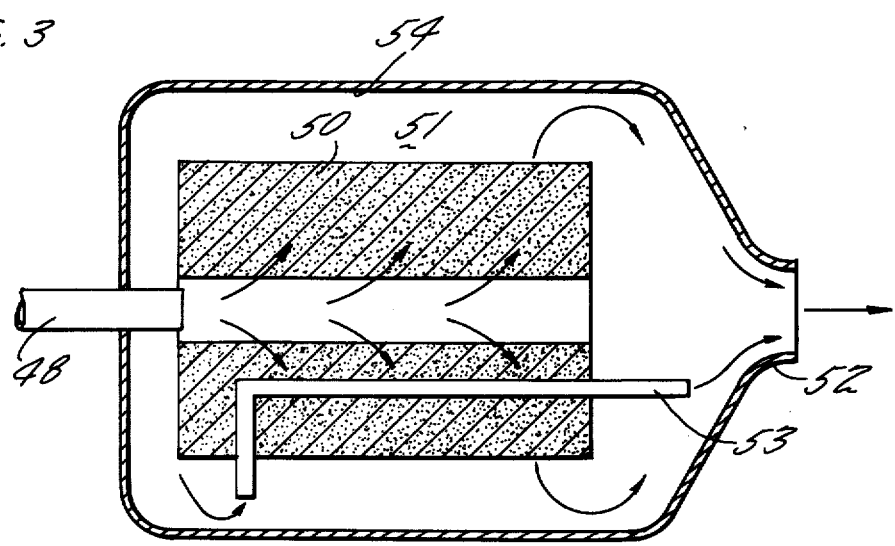
FIG. 3 is a sectional view illustrating still another embodiment of this invention.

FIG. 3 exemplifies still another embodiment of this invention as applied to a radial flow thrustor or gas generator. Monopropellant injected thru inlet 48 passes radially thru catalytic or thermal bed 50. The hot gases are collected into the annular space 51 and discharge thru the exhaust nozzle 52 for producing thrust. A plurality of regenerative tubes 54 (only one being shown) conduct the hot decomposed gases accumulated in chamber 51 adjacent casing wall 54 and the end of the catalytic bed 50 adjacent the exhaust nozzle 52.

It should be understood that the invention is not limited to the particular embodiments shown and described herein, but that various changes and modifications may be made without departing from the spirit or scope of this novel concept as defined by the following claims.

We claim:

1. A monopropellant engine including an engine casing having a thermal reaction section, a gas generating section, and an injector for distributing monopropellant fuel into the reaction section, means for conducting the gases in said gas generating section to said thermal reaction section and then to a low pressure source, which pressure is lower than the pressures in the gas generating section, and said means being fabricated from material that effectively conducts heat from the gases passing therethrough to provide hot surfaces whereby the decomposition of said monopropellant injected into said thermal reaction section is enhanced.

2. A monopropellant engine as claimed in claim 1 wherein said means includes a plurality of tubes.

3. A monopropellant engine as claimed in claim 1 wherein said thermal reaction section includes a cylindrical member supporting a catalyst or thermal bed adjacent the inlet and having the gas generating section remote from the inlet, said cylindrical member being spaced from said casing defining an annular passage communicating with the discharge opening formed substantially on the same end of the casing as the inlet.

4. A monopropellant engine as claimed in claim 2 wherein said engine is of the radial flow type, an exhaust nozzle discharging the gases of the decomposed monopropellant, said tubes terminating in close proximity to said exhaust nozzle.

5. A monopropellant engine as claimed in claim 4 wherein said tubes extend through said casing for discharging overboard said gases passing therethrough.

* * * * *